Sept. 8, 1925.　　　　　　　　　　　　　　　　　　　　1,553,175
A. J. KERCHER
ELECTRIC COOKER
Filed Sept. 29, 1923　　　　3 Sheets-Sheet 1
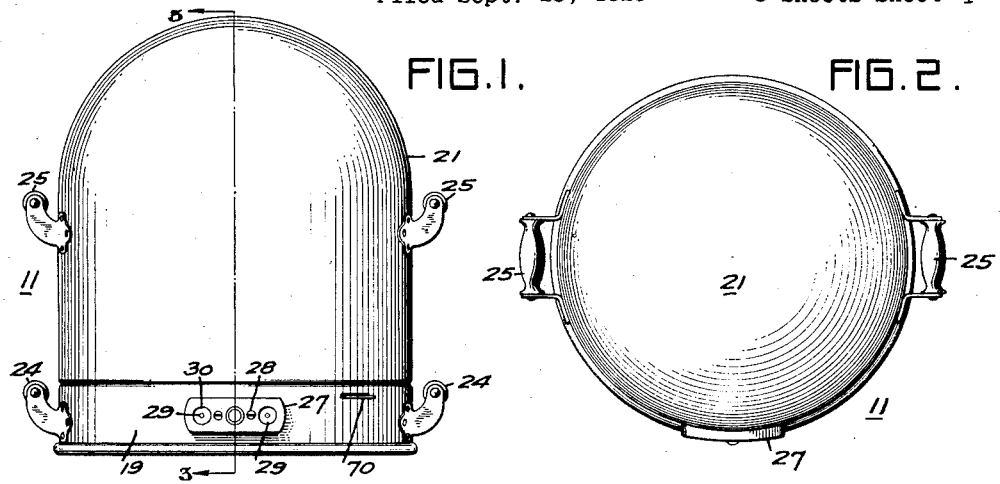
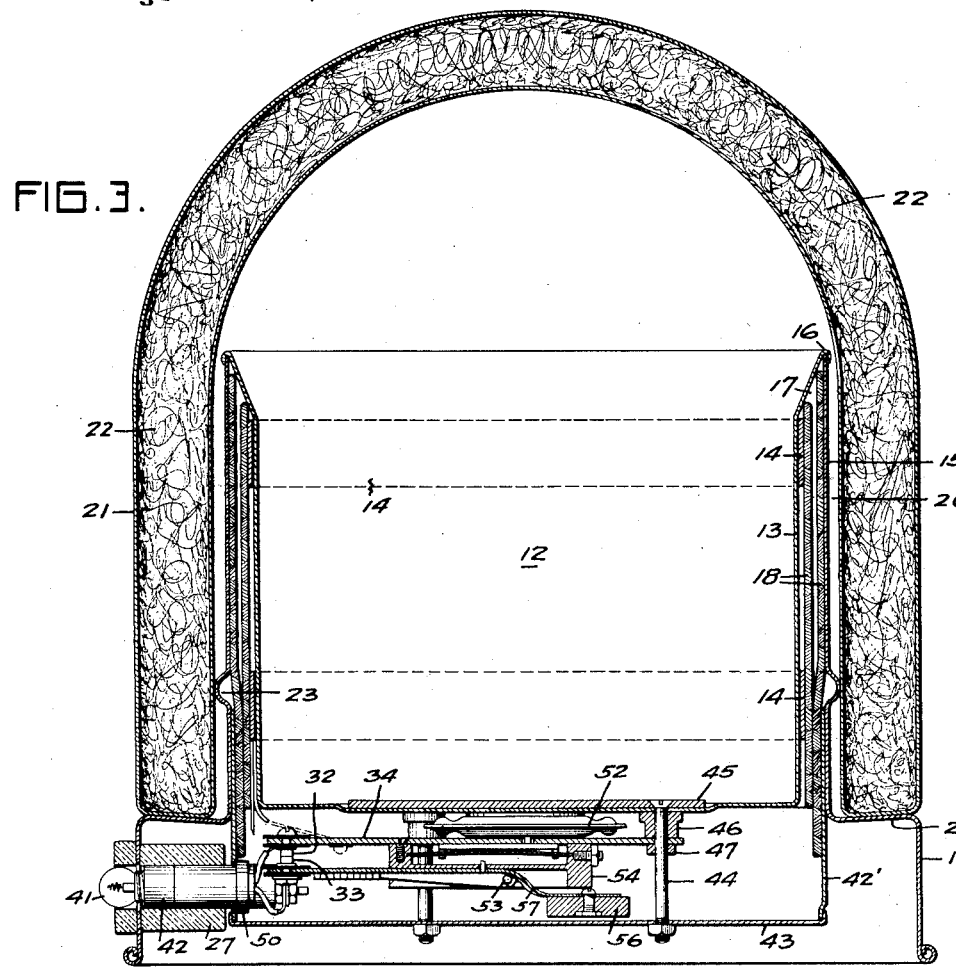

Sept. 8, 1925.
A. J. KERCHER
ELECTRIC COOKER
Filed Sept. 29, 1923
1,553,175
3 Sheets-Sheet 2
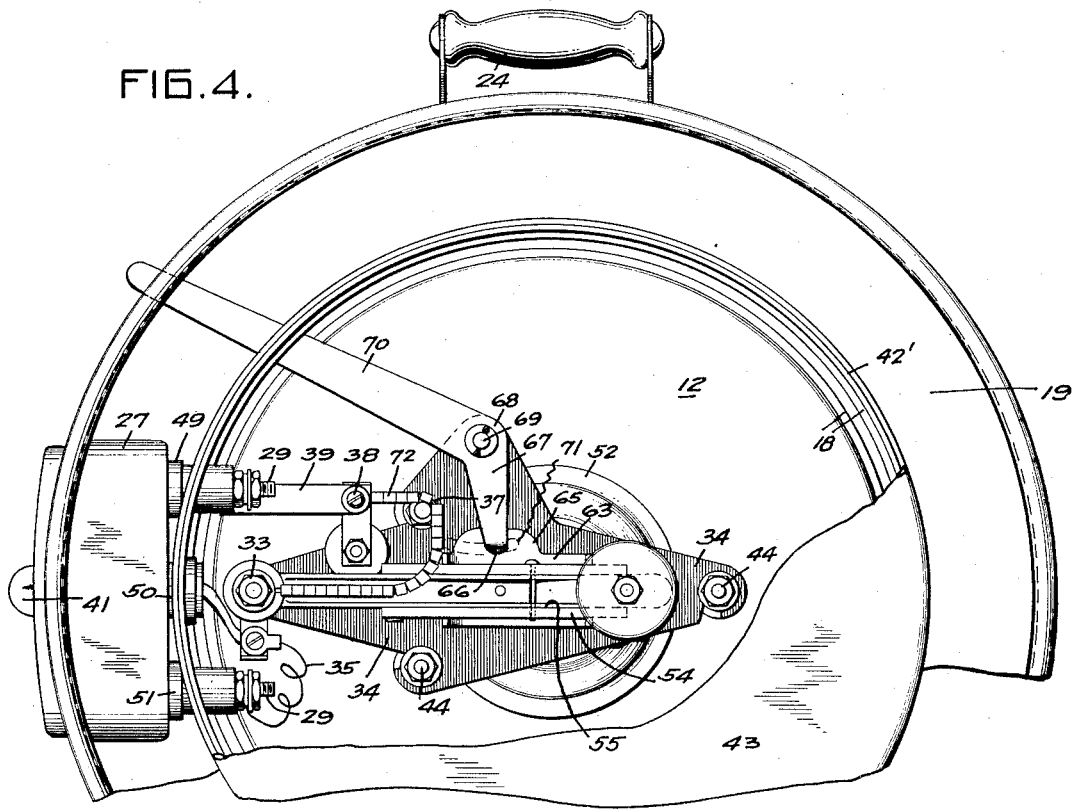
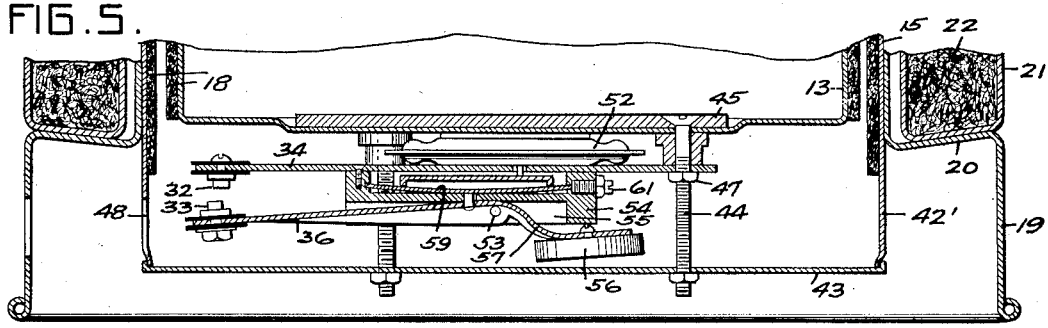
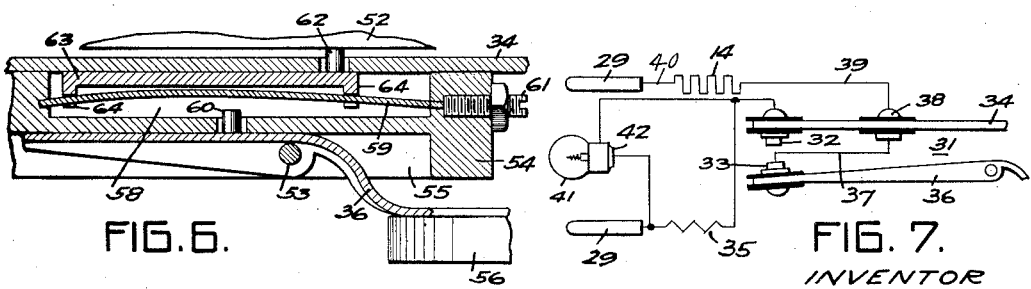
WITNESS:
H. Sherburne.
L. J. Sementi.
INVENTOR
Arthur J. Kercher
BY White Prost Evans
his ATTORNEYS Sept. 8, 1925.

A. J. KERCHER 1,553,175

ELECTRIC COOKER

Filed Sept. 29, 1923

WITNESSES:
H. Sherburn
T. J. Serventi

INVENTOR
Arthur J. Kercher
BY
White Prost Evans
his ATTORNEYS.

Patented Sept. 8, 1925.

1,553,175

UNITED STATES PATENT OFFICE.

ARTHUR J. KERCHER, OF BERKELEY, CALIFORNIA.

ELECTRIC COOKER.

Application filed September 29, 1923. Serial No. 665,703.

*To all whom it may concern:*

Be it known that I, ARTHUR J. KERCHER, a citizen of the United States, and a resident of the city of Berkeley, in the county of Alameda and State of California, have invented a new and useful Electric Cooker, of which the following is a specification.

This invention relates to a cooker that is adapted to be heated by electrical energy, and more particularly to such a device in which the heat generated by the heating units is conserved by the aid of heat insulation to as great an extent as is practicable, and in which a regulating thermostat is provided for maintaining the temperature at a predetermined value.

This application is a continuation in part of my copending application entitled Electric cooker, filed Mar. 26, 1923, and having Serial No. 627,661.

Since it is well known that success in cooking depends a great deal upon the control of the temperature of the food itself during the process of cooking, it is one of the objects of my invention to ensure that the temperature control be based as much as possible on the temperature of the cooking food, irrespective of the temperatures prevailing in other parts of the cooking chamber. In many of the prior devices the temperature responsive element, enacting a controlling function is exposed to a substantial degree to the heat generated near to the heating elements. This degree of heat usually differs materially from that of the food itself, and it is thus seen that the best cooking effects are incapable of attainment in such forms of cookers. With my device I make certain that the control is responsive to the temperature of the cooking food. The food is rendered of higher quality, and cooking is effected on the most logical and proper basis.

It is a matter of common observance that varying articles of food require varying degrees of heat for the best results in cooking. In order to profit by these observations, it is advantageous to provide an adjustment for the temperature control, whereby the thermostat may be made to respond to any of a series of temperatures. It is another object of my invention to provide a thermostat that may be very simply adjusted to provide varying degrees of heat.

In order to ensure economical operation of the cooker, it is advantageous to provide for as good heat insulation as possible. It has been customary in this connection to utilize an enclosed cabinet or container, with a tightly fitted cover, both the cabinet and cover having a heat insulating layer of considerable thickness. With such tightly closed covers there is some difficulty in maintaining the closure tight throughout its period of service. In my cooker these disadvantages are obviated by the use of a cover that slips somewhat loosely over the entire container, so as to form with it a pair of telescoping sections. To prevent escape of heat it is not at all essential to make the telescoping cover fit close, since whatever steam or vapor may be given off must, in order to escape, travel a tortuous path, one part of the path being in a downward direction between the cover and the container.

Furthermore, additional heat insulation against direct radiation may be had by providing an insulation covering both for the container and for the telescoping portion of the cover, so that there are two layers separated by a small clearance space between the telescoping sections. It is evident that in this way the heat is confined within the cooking space itself without the necessity of expensive manufacturing operations.

My invention possesses other advantageous features, some of which with the foregoing, will be set forth at length in the following description, where I shall outline in full that form of the invention which I have selected for illustration in the drawings accompanying and forming part of my present specification. Although I have shown in the drawings but one embodiment of my invention, it is to be understood that I do not desire to be limited thereto, since the invention as expressed in the claims may be embodied in other forms also.

Referring to the drawings:

Figure 1 is a side elevation of a cooker embodying my invention;

Figure 2 is a top plan view of the cooker shown in Fig. 1;

Fig. 3 is an enlarged sectional view taken along the plane 3—3 of Fig. 1, showing the thermostat switch in closed position;

Fig. 4 is an enlarged fragmentary view taken from the bottom of the cooker;

Fig. 5 is an enlarged fragmentary sectional view similar to Fig. 3, but showing the thermostat switch in open position;

Fig. 6 is an enlarged sectional view showing how the thermostat may be adjusted for varying the cooking temperature;

Fig. 7 is a diagram of connections for the cooker; and

Figure 8:
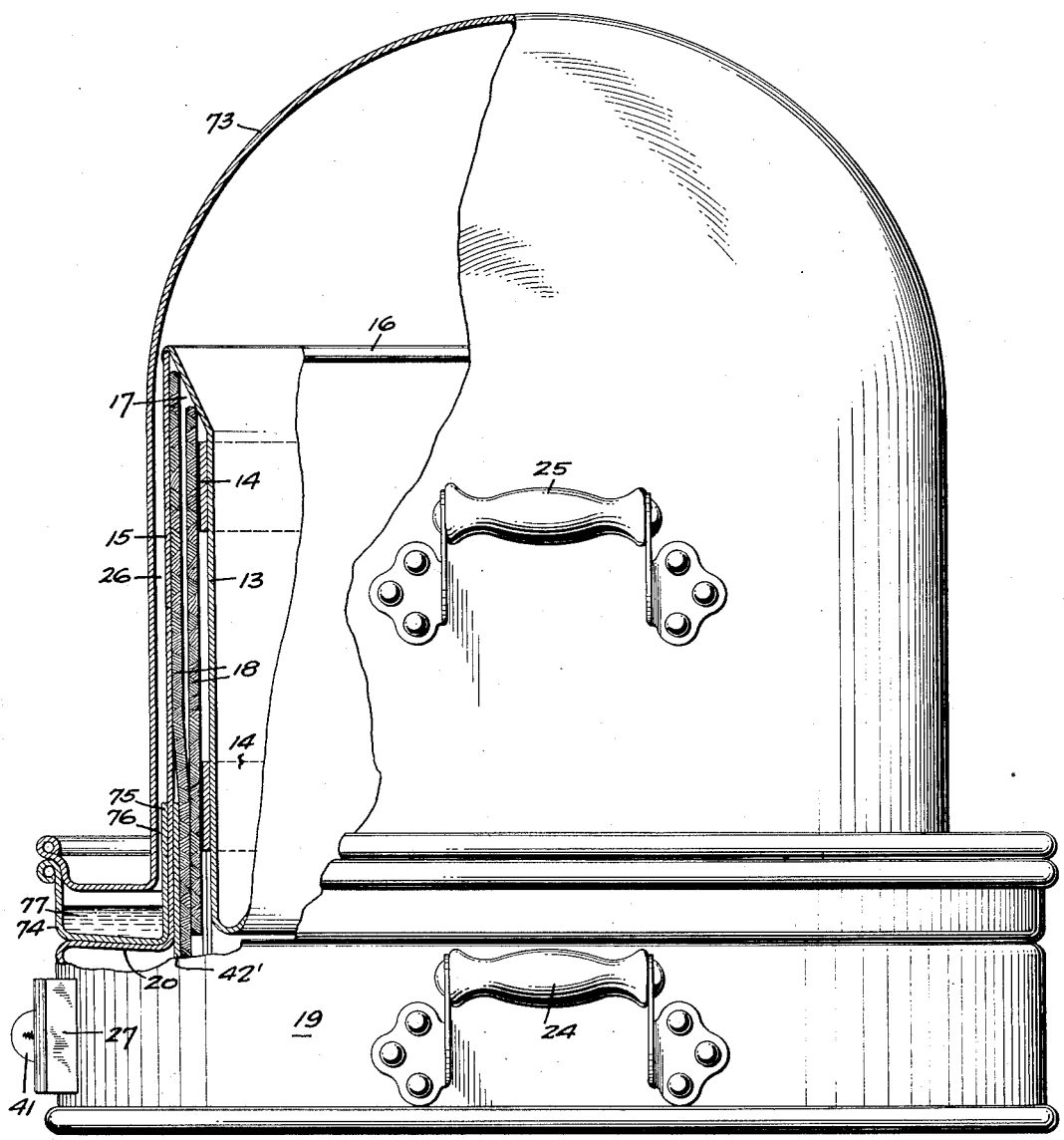
Fig. 8 is a sectional view of a modified form of cooker.

The cooker 11 is in the present instance in the form of a cylindrical body, and includes a cooking chamber 12 formed within a container or vessel 13. This vessel is preferably made from sheet metal such as copper or aluminum, and is of any convenient size. The food to be cooked is first disposed in a pot or pan, that is adapted to be accommodated within the chamber 12. In order to supply this chamber with heat for cooking, one or more electric heating elements 14 are disposed in good heat conducting relation with the vessel 13, and these elements in the present instance are shown in the form of bands or rings encircling the vessel 13, and located thereon so as to heat the chamber 12 evenly.

In order to enclose and conceal the heating elements 14, as well as to provide heat insulation for it and the vessel 13, an encompassing wall 15 is disposed about this vessel. There is thus formed a double walled structure, between the double walls of which is accommodated the heating elements 14. This wall 15 is appropriately fastened near its top to the open end of the vessel 13, as by the seaming 16. Although in the present instance the space 17 formed between the walls is shown as not completely filled with heat insulating material, such an arrangement may be used if desired, in lieu of the sheets of insulating material 18 shown in Fig. 3. The wall 15 is extended to form a base 19 within which the control elements for the device may be accommodated. The top of base 19 also forms an annular rim 20 around the bottom of wall 15, which rim serves as a rest or support for the cover 21. This cover is double walled as indicated, and telescopes over the chamber 12. Between the double walls, insulating material 22 is packed. Furthermore the telescoping is purposely made loose, knobs or projections 23 being provided on the exterior of wall 15 to space the cover therefrom. The surfaces of contact on rim 20 and the bottom of cover 21 are purposely sloped towards the center, so that the tendency for the cover to become misalined is reduced. Handles such as 24 and 25 may be fastened to the exterior of the base 19 and the cover 21 for facilitating manual transportation as well as manipulation of cover 21. The cover 21 has a hemispherical top forming an inner concave or inclined surface. Upon this inner surface, whatever vapor, generated in vessel 12, may be condensed, is led by this surface down along the sides thereof, and the condensed vapors cannot therefore drip on the cooking vessels in the chamber 12.

The provision of a loosely fitted telescoping cover such as 21, that extends substantially as far as the bottom of the cooking chamber 12 has many advantages. In order for any heat to be radiated externally from the chamber 12, it must pass not only through two sets of double walls, but also through the intervening air space 26 formed between the cover and the vessel 13. Loss of heat by escaping vapor from the food is minimized, since whatever vapor is left uncondensed must work its way downward through this annular space and out between the cooperating surfaces on the cover 21 and rim 20. Such a tortuous course for the vapors forms substantially an impassible obstacle, and these uncondensed vapors are substantially entirely confined within the inner wall of vessel 13 and the top of the cover 21. This form of cover is furthermore very simple to manufacture, since no great accuracy is demanded, as in previous types of cookers.

The supply of electric current to the heating elements is effected by the aid of a connection block 27 held on the base 19. In the present instance this block is shown as made up of two parts which are disposed one on the inside and the other on the outside of the base, and clamped together, as by the aid of screws 28 passing through the base. This connection block has a pair of contact posts 29 which are below the surface of the block and located in bores 30 therein. Into these bores, appropriately formed plugs may be inserted to contact with the posts 29.

As shown most clearly in the diagram of connections, the circuit for the heating elements 14 which connects to the posts 29, is controlled by a switch 31 having relatively movable contacts 32 and 33. The stationary contact 32 is insulated from and supported by a metallic plate 34, and connects, as by the aid of a lead 35, to the lower post 29. The movable contact may be supported on a lever 36; a short lead 37, insulated by beads 72, connects this contact with another stationary insulated contact post 38, to which one lead 39 of the heating elements 14 is connected. The other lead 40 from these elements connects directly with the upper post 29. With the switch closed as in Fig. 3, and posts 29 connected to an external source, the elements 14 are active, their circuit being completed as follows:—from lower post 29, lead 35, stationary contact 32, movable contact 33, lead 37, post 38, lead 39, heating elements 14, to upper post 29. In order to indicate whether the heating elements are active or not, I provide a small pilot light 41 disposed in a socket 42 in the block 27 which is connected in parallel to the lead 35. This lead is purposely made of sufficiently high resistance so as to provide a large enough drop in potential to light the lamp when current is being supplied.

The switch 31, with its asociated parts, is located below the chamber 13 and is concealed by a tubular extension 42' projecting from the bottom of the wall 15, and a cover 43 for this extension. This cover 43 is held in place by aid of a plurality of screws or studs 44, which pass through the bottom of chamber 12 and a reenforcing plate 45 disposed therein. These studs may also conveniently serve to support the plate 34 rigidly, as for example by the aid of bushings 46 disposed thereon and nuts 47 engaging the studs. Furthermore the extension 42' is apertured at one side, as indicated at 48, Fig. 5, for accommodating the insulation bushings 49, 50 and 51 which are used to lead the connections from the block 27 to the space defined by the extension 42' and its cover 43.

In order to guard against undesirable or dangerous temperatures in the cooking chamber 12, a thermostat is arranged to open the switch upon the attainment of a definite temperature therein. When the switch opens, the heating elements 14 are deenergized, and remain so until the temperature recedes to a lower value. Upon this occurring, the switch is permitted to close again. The cycle of operations may then be repeated many times until some other agency causes the circuit to be finally interrupted somewhere externally of the cooker itself, as for example by withdrawal of the plugs from the posts 29. The thermostat is arranged so that it is acted upon by the temperature developed in chamber 12, and not to any material extent by the temperature developed immediately adjacent the heating elements. It is evident that in this way the actual cooking temperature may be controlled to a nicety. To accomplish this result, the thermostat is arranged in close heat conducting relation with the bottom of chamber 12. I prefer to employ a thermostat utilizing a readily volatizable fluid in an enclosed chamber, such as defined by the cell 52. This cell is placed adjacent the bottom of the chamber 12, so that it may be in as good thermal conductive relation with the cooking food as practicable. The cell 52 has resilient metal disc faces such as spring copper, which may be expanded or forced out by the pressure exerted in the cell due to the volatilization of the liquid therein. The cell 52 is held in place against the bottom of the chamber 12 by soldering. Expansion of the cell to a sufficient degree causes the contact 33 to move away from the stationary contact 32 and to open the heating element circuit. Fig. 3 shows the cell 52 in a condition when it has not expanded sufficiently to operate the movable contact 33, while Fig. 5 shows the cell expanded sufficiently to move the contact 33.

The mechanical connections whereby the expansions and contractions of the cell 52 operates the switch contact 33 will now be described. The movable switch lever 36 is pivoted on a pin 53 which is carried by a stationary support 54, fastened to the bottom of plate 34. This support 54 may be grooved, as at 55, in order to accommodate the lever 36. Furthermore this lever is biased yieldingly to closed position, and for this purpose a counterweight 56 is fastened to an arm 57 of the lever 36. I prefer to provide, as one of the elements in the mechanical connection from the pressure cell 52 to the switch arm 36, a buckled leaf spring 59; this spring 59 is arranged so that it may press against a projection or pin 60, fastened to the lever 36 and extending into a space 58 formed in the support 54 adjacent the plate 34. This space may also be conveniently used for accommodating the spring 59, the ends of which are shown as anchored in the end walls of the space. The buckling of the spring is so adjusted that its stable position corresponds to that shown in Fig. 3 or Fig. 6, where it is arched away from the pin 60, and thus permits the switch contacts to remain closed. The buckling of the spring so that its arch coacts with the pin 60 to urge contact 33 away from the stationary contact 32 is unstable, and it can be held in this position only by the force exerted on the spring 59 by the expanding cell 52. In order to adjust the buckling of the spring, a set screw 61 is provided for exerting a force against one end of the spring 59, as by threading into an appropriate aperture in the support 54.

The expansion of cell 52, if sufficiently great, effects the buckling of spring 59 so that it may be sprung to the position of Fig. 5, and since this buckling is in the nature of a snap action, the contacts open quickly. Conversely, upon a slight contraction of the cell 52, the spring returns to its stable position of Fig. 3, and permits the contacts to close.

Although any of several different kinds of mechanical connections may be employed between the cell 52 and the spring 59 to effect this result, I prefer to make this connection adjustable, so as to vary the leverage of the force exerted by the expanding cell. In this way the temperature at which the thermostat operates may be controlled. For this purpose, there is interposed between a projection or pin 62 of the cell 52, and the spring 59, an adjustable slide 63. This slide has a pair of feet 64 resting on the spring, and a back cooperating with pin 62 of cell 52. The feet 64 are separated by an appreciable distance, so that they each are adjacent respectively to the anchored ends of spring 59. One of the feet, such as 64 is much closer to the pin 62, and serves to transmit substantially all of the force to the spring which is exerted by the cell 52. By moving the slide 63 so as to bring this right hand foot 64 nearer the pin 62, the force exerted by this foot on the spring 59 approaches that exerted by cell 52, and at the same time, the lever arm of this force is also increased, since it is measured from the right hand anchored end of spring 59 to the point of application of the force. Fig. 6 illustrates this position, which corresponds to a low temperature adjustment, since less force need be exerted by the cell 52 to exert a large enough torque on the spring for urging it to the position of Fig. 5. The left hand foot 64 is provided merely for supporting the slide 63; the force exerted thereby on the spring is of no substantial value since it is always at a considerable distance from the pin 62. Furthermore due to the large flexure of spring 59, the force exerted by the right hand foot has influence in turning the spring only about its right hand anchored end, and no appreciable influence as regards the left hand end. In an analogous manner, the left hand foot, which is as before stated used merely for supporting the slide 63, has no appreciable effect in assisting the torque exerted by the right hand foot about the right hand end of the spring 59.

By referring to Fig. 4, one manner in which the slide 63 may be adjusted, is indicated. The slide has an extension 65 in which there is an aperture 66. Into this aperture the end of the arm 67 of a pivoted lever 68 is turned. This lever is pivoted on a pin 69 held on the stationary plate 34. It is evident that by rotating this lever, the slide 63 may be adjusted. The arm 70 serves as a convenient means for effecting this result, and for ease in manipulation, this arm extends through appropriate slots in the extension 42' and base 19 so that it is accessible from the outside of the cooker. I prefer to provide an arcuate guide 71 cut in the plate 34 for accommodating the end of arm 67 so that this end may project a considerable distance through the extension 65 of slide 63.

In the form of the cooker illustrated in Figures 1, 2, and 3, the cover 21 is made insulating as regards heat radiation from the cooker, by the aid of a layer of material 22. It is not essential of course that such an expedient be used, since in many instances the space 26 serves this purpose very well. On the other hand, the cover may be insulated against heat conduction by the aid of a highly polished interior surface, which serves to reflect the heat back into the cooker. Such a modification of the cover is illustrated in a diagrammatic manner in Fig. 8. In this figure, the telescoping cover 73 is shown as made of a thin sheet of metal fitting loosely over the vessel 15. The interior surface of the cover is preferably polished in order to render the escape of heat difficult. This modification also incorporates a scheme that may be used for sealing the cooker in a more perfect manner, so that no odors or vapors can escape therefrom. Thus it is possible to cook food without the danger of offensive odors being given off, which are apt to occur when certain kinds of food, such as cabbage, is cooking. I have found that with the expedient hereinafter described, the cooker may be operated for a long period of time with any kind of food without the detection of any odors.

In order to secure this result, a ring pan 74 is utilized, which rests on the rim 20 and has an inner wall 75 that extends for a short distance upward on the outside of vessel 15. This pan forms a trough around the cooker. The rim of the cover 73 fits into the pan 74, but permits an open annular space 76 to be formed between the inner wall 75 of the pan and the inner surface of the cover. In this way any steam or vapor coming down through the annular space 20 is trapped and condensed in the pan 74, as indicated at 77; furthermore, all liquid caused by vapors condensing directly in vessel 12 collects on the inner concave surface of cover 73, and is thereby led downward into the annular pan 74. Since a large part of the vapors in this form of the cooker actually condenses on the cover, the latent heat of condensation is given up inside of the vessel 12, and there is thus very little heat loss.

I claim:

1. In an electric cooker, means forming a cooking chamber, one or more electric heating elements coiled around the chamber, and a temperature responsive controller for the elements disposed near the bottom of the chamber and at a substantial distance from the elements.

2. In an electric cooker, a vessel forming a cooking chamber, means for electrically heating the chamber, a base for the vessel providing a rim near its bottom, a thermal controller for the electrical heating means disposed in the base, said controller having a heat responsive element in direct thermal contact with the base, and an insulating cover telescoping over the vessel and resting on the rim.

3. In an electric cooker, an open vessel forming a cooking chamber, means for electrically heating the chamber, and an insulating cover for the vessel arranged to provide a tortuous path open to the atmosphere for the heated vapors developed in the chamber.

4. In an electric cooker, an open vessel forming a cooking chamber, means for electrically heating the chamber, and an insulating cover forming an air space between it and the outside of the vessel, whereby a tortuous path to the atmosphere is provided for the heated vapors developed in the chamber.

5. In an electric cooker, an open vessel forming a cooking chamber, a removable annular pan disposed around the vessel near its bottom, and a cover telescoping over the vessel, but spaced therefrom and resting on top of the pan.

6. In an electric cooker, an open vessel forming a cooking chamber, a removable annular pan disposed around the vessel to catch condensed vapors, and a loosely fitting cover for the vessel.

7. In an electric cooker, an open vessel forming a cooking chamber, means for electrically heating the chamber, and means providing a tortuous path for the heated vapors developed in the chamber to the external atmosphere.

8. In a cooker, means forming an open cooking chamber, means for heating the chamber, a cover fitting over the chamber forming means so as to form with the exterior thereof a narrow passageway, said cover having an inner concave surface adapted to be disposed above the interior of the chamber and to guide condensed liquid into the narrow passageway, and a receptacle arranged around the chamber forming means and in communication with this passageway for accommodating the condensed liquid, said cover arranged to rest on top of the receptacle, whereby a narrow passageway to the external atmosphere is provided.

9. In an electric cooker, an open vessel forming a cooking chamber, an electrical heating element for the chamber, a cover formed of a single layer of sheet metal telescoping over the chamber and forming with the exterior surface thereof a narrow annular passageway, said cover having an inner top surface sloping toward the sides, and its inner surface polished, and a rim for the chamber providing a space for the condensation of vapors given off by the cooker, said cover being arranged to rest on top of the rim.

10. In an electric cooker, an open vessel forming a cooking chamber, an electrical heating element for the chamber, a cover having a top sloping toward the sides telescoping over the vessel so as to form with the exterior thereof a narrow annular passageway, and an annular receptacle communicating with this passageway, and formed around the vessel, said cover being formed to cover up this receptacle by resting on top thereof.

In testimony whereof, I have hereunto set my hand.

ARTHUR J. KERCHER.